United States Patent [19]
Wada

[11] Patent Number: 5,394,282
[45] Date of Patent: Feb. 28, 1995

[54] CARTRIDGE HOLDING MECHANISM FOR MAGNETIC TAPE CARTRIDGE APPARATUS

[75] Inventor: Satoshi Wada, Yamagata, Japan
[73] Assignee: NEC Corporation, Tokyo, Japan
[21] Appl. No.: 153,962
[22] Filed: Nov. 18, 1993

[30] Foreign Application Priority Data
Nov. 18, 1992 [JP] Japan ................... 4-308388

[51] Int. Cl.⁶ ............................................. G11B 5/008
[52] U.S. Cl. ................................... 360/96.5; 360/85
[58] Field of Search ................ 360/96.5, 85, 96.6; 242/197-200

[56] References Cited
U.S. PATENT DOCUMENTS
4,635,146 1/1987 Koda et al. .......................... 360/85
5,235,480 8/1993 Oh ..................................... 360/96.5

Primary Examiner—A. J. Heinz
Attorney, Agent, or Firm—Sughrue, Mion, Zinn, Macpeak & Seas

[57] ABSTRACT

A cartridge holding mechanism, for a magnetic tape cartridge apparatus, includes a cartridge holder having guide rollers rotatably supported thereon for holding a magnetic tape cartridge housing. A base plate having guide grooves is provided for guiding the guide rollers to move the cartridge holder vertically. A bottom lever is rotatably supported by the base plate and has first ends formed with grooves which are engaged with the guide rollers, and an opposite end rotatably supporting a cam roller. A cam drum is rotatably supported by the base plate and has, on a surface thereof, a cam groove engaged with said cam roller and, on an upper portion thereof, a drum gear. The mechanism further includes a load motor having a motor gear meshed with the drum gear for driving the cartridge holder.

6 Claims, 3 Drawing Sheets

CARTRIDGE HOLDING MECHANISM FOR MAGNETIC TAPE CARTRIDGE APPARATUS

BACKGROUND OF THE INVENTION

The present invention relates to a magnetic tape cartridge apparatus to be used in an information processing apparatus, etc., and, particularly, to a cartridge loading mechanism for loading a magnetic tape cartridge in a congregational tape cartridge apparatus which contains a large number of magnetic tape cartridges, when an information read or write operation is performed with respect to the magnetic tape cartridges.

A conventional magnetic tape cartridge apparatus of such type is shown in FIGS. 6 and 7. In these figures, the magnetic tape cartridge apparatus is constituted by a cartridge holder 21 for holding a magnetic tape cartridge, a guide roller 22 provided rotatably on the cartridge holder 21, guide plates 24 formed with guide grooves 23 for guiding a movement of the guide roller 22, levers 25 rotatably supported on a base plate, push levers 26 rotatably provided on the levers 25, lever springs 27 for pulling the push levers 26 toward the levers 25, timing gears 29 meshed with lever gears 28 formed on the levers 25, a timing shaft 30 rotatable with the timing gears 29 for operating the levers 25 simultaneously, a worm wheel 31 fixedly secured to one end of the timing shaft 30, a load worm 32 meshed with the worm wheel 31 and a load motor 33 for driving the timing shaft 30 through the worm wheel 31 and the load worm 32.

A cartridge loading mechanism of the conventional magnetic tape cartridge apparatus has, however, several problems to be described below.

First, since the timing shaft which drives the cartridge holder to load or eject a magnetic tape cartridge is provided perpendicularly to the moving direction of the cartridge holder and the load motor, the load worm and the worm wheel which rotate the timing shaft are provided in the same plane of the timing shaft and laterally of the cartridge holder, it is necessary to provide a space large enough to arrange the timing shaft, the load motor, the load worm and the worm wheel laterally of the cartridge holder, causing the magnetic tape cartridge apparatus to become bulky.

Second, in order to prevent the timing shaft from rotating in a reverse direction accidentally, the worm wheel is provided between the load motor and the cartridge holder. Since transmission efficiency of the worm wheel itself is low, it is necessary to use a large load motor which generates a large driving force, leading to a large sized magnetic tape cartridge apparatus as a whole.

SUMMARY OF THE INVENTION

An object of the present invention is to provide a cartridge loading mechanism of a magnetic tape cartridge apparatus which is capable of reducing a lateral space of a cartridge holder, making it possible to use a small size load motor and reducing the size of the magnetic tape cartridge apparatus overall.

The cartridge loading mechanism of the magnetic tape cartridge apparatus according to the present invention comprises a cartridge holder for holding a magnetic tape cartridge storing a magnetic tape and having guide rollers mounted rotatably, a base plate having guide grooves for guiding the guide rollers to drive the cartridge holder vertically, a bottom lever supported rotatably by the base plate and having first ends formed with grooves engaged with the guide rollers and an opposite end provided rotatably with a cam roller, a cam drum rotatably supported by the base plate and having a cam groove engaged with the cam roller and a drum gear in an upper portion thereof and a load motor having a motor gear meshed with the drum gear and driving the cartridge holder by rotating the cam drum through the motor gear and the drum gear.

BRIEF DESCRIPTION OF THE DRAWINGS

The features and advantages of the present invention will become apparent from the following description when taken in conjunction with the accompanying drawings, in which.

In these figures, the same reference numerals depict the same constitutional components, respectively.

DETAILED DESCRIPTION OF THE PREFERRED EMBODIMENTS

Figure 6:
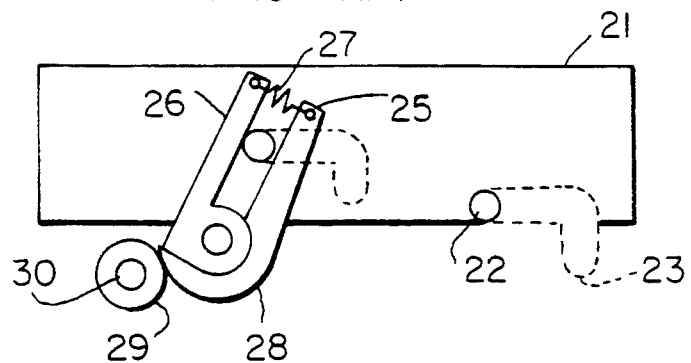
FIG. 6 is a side view of an example of a cartridge loading mechanism of a conventional magnetic tape cartridge apparatus.
Figure 7:
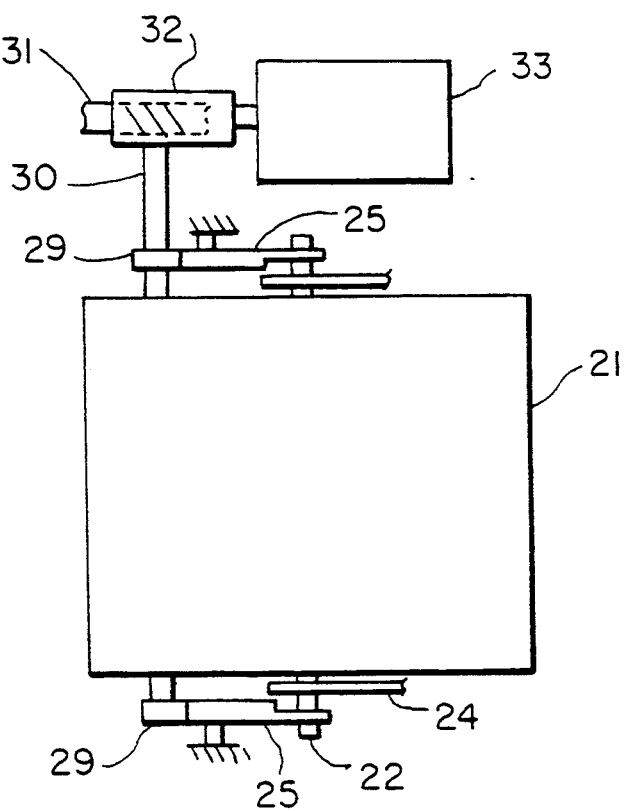
FIG. 7 is a plan view of the conventional cartridge loading mechanism shown in FIG. 6.

In order to clarify an object, a construction and an operation of a cartridge loading mechanism of a magnetic tape cartridge apparatus according to the present invention, an operation of a conventional cartridge loading mechanism will be described first with reference to FIGS. 6 and 7.

Initially, it is assumed that a magnetic tape cartridge is loaded in the cartridge holder 21.

In this case, the load motor 33 rotates the load worm 32 by which the worm wheel 31 is rotated and thus the timing shaft 30 meshed with the worm wheel 31 is rotated.

With the rotation of the timing shaft 30, the timing gears 29 provided integrally with the timing shaft are rotated and, through the meshing relation between the timing gears 29 and the lever gears 28 provided on the levers 25, the levers 25 and the push levers 26 are moved in the same direction simultaneously through the lever springs 27.

At this time, the guide rollers 22 provided on the cartridge holder 21 are brought into contact with the levers 25, guided along the guide grooves 23 preliminarily provided in the guide plates 24 by the movement of the levers 25 and positioned at a position in which the magnetic tape cartridge is loaded on the cartridge holder 21.

When the magnetic tape cartridge is to be ejected from the cartridge holder 21, the load motor 33 rotates the load worm 32 by which the worm wheel 31 is rotated together with the timing shaft 30 meshed therewith.

With the rotation of the timing shaft 30, the timing gears 29 integrally provided on the timing shaft are rotated and, through the meshing relation between the timing gears 29 and the lever gears 28 provided on the levers 25, the levers 25 and the push levers 26 are moved simultaneously in the same direction through the lever springs 27.

At this time, the guide rollers 22 provided on the cartridge holder 21 are brought into contact with the push levers 26, guided along the guide grooves 23 preliminarily provided in the guide plates 24 by the movement of the levers 25 and positioned at a position in which the magnetic tape cartridge is ejected from the cartridge holder 21.

Figure 1:
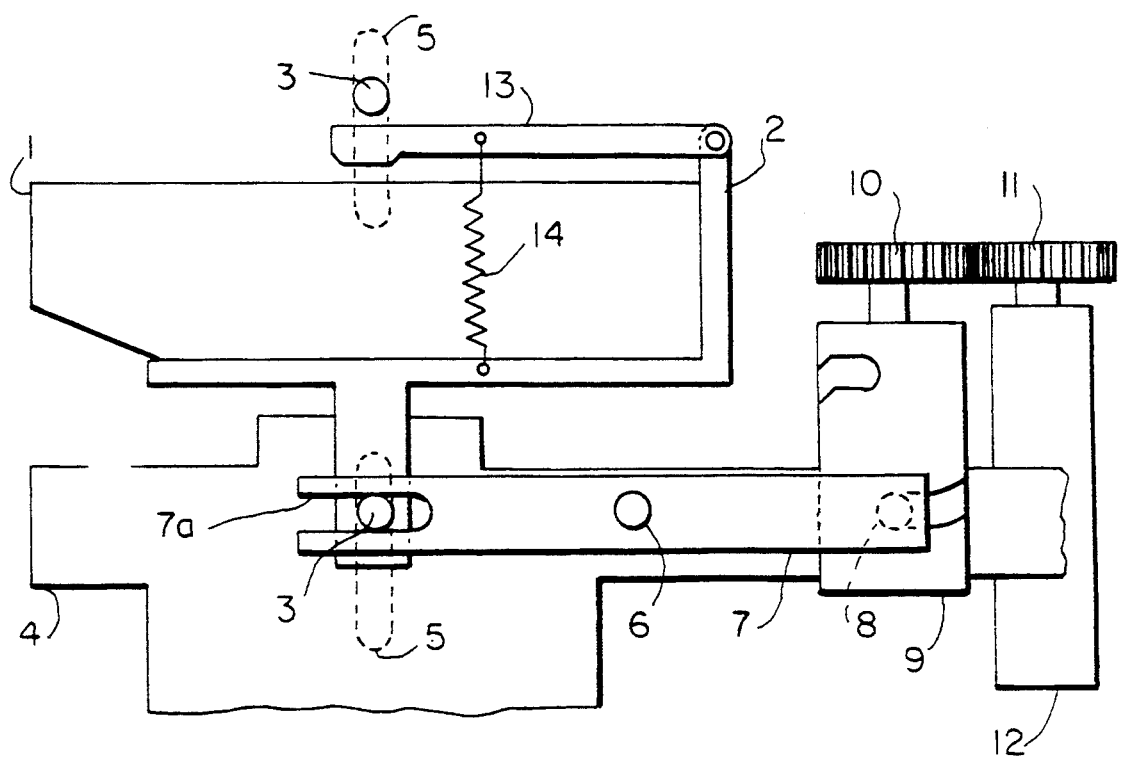
FIG. 1 is a side view of a cartridge loading mechanism of a magnetic tape cartridge apparatus according to a first embodiment of the present invention.
Figure 2:
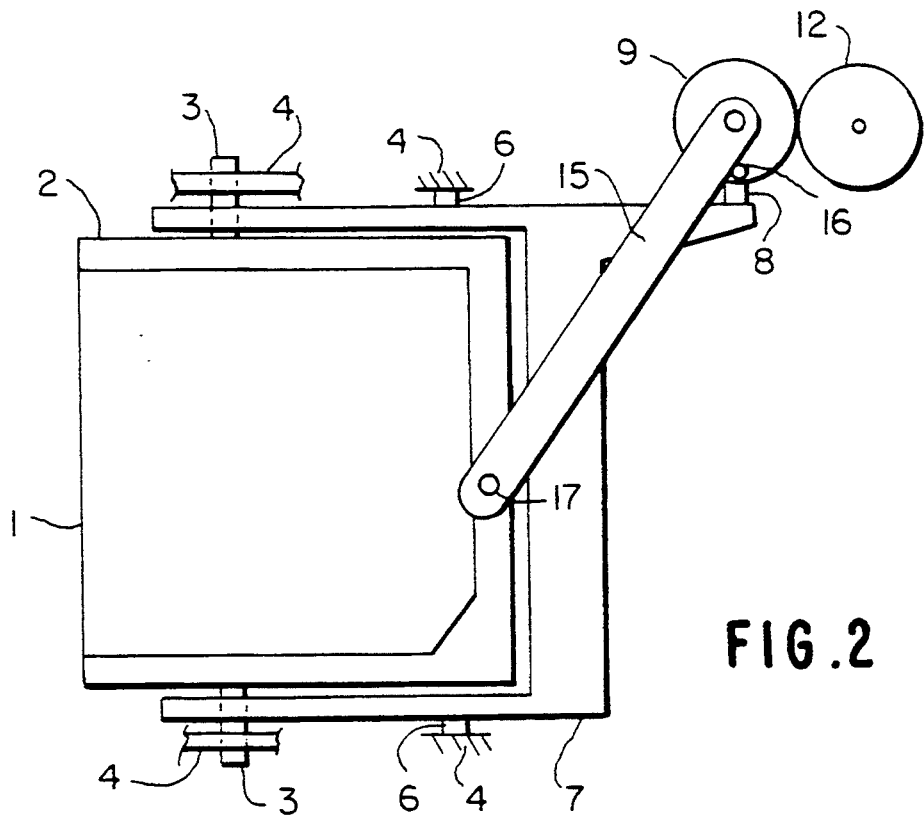
FIG. 2 is a plan view of the mechanism shown in FIG. 1.
Figure 3:
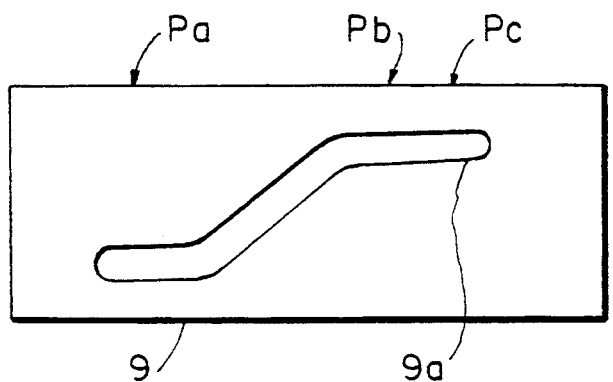
FIG. 3 is an extended view of a cam drum 9 of the first embodiment shown in FIG. 1.

An embodiment of the present invention will be described with reference to FIGS. 1 to 3, in which FIG. 1 is a side view of a cartridge loading mechanism of a magnetic tape cartridge apparatus according to a first embodiment of the present invention, FIG. 2 is a plan view of the mechanism shown in FIG. 1 and FIG. 3 is an extended view of a cam drum 9 of the first embodiment shown in FIG. 1.

Referring to FIG. 1, the cartridge loading mechanism of a magnetic tape cartridge apparatus according to the first embodiment of the present invention comprises a cartridge holder 2 for holding a magnetic tape cartridge 1. Guide rollers 3 are provided rotatably on the cartridge holder 2. A base plate 4 is provided and has guide grooves 5 for guiding the guide rollers 3 vertically. A bottom lever 7 is supported rotatably by the base plate 4 and is engaged with the guide rollers 3 at grooves 7a formed in first ends thereof, with a cam roller 8 being rotatably provided on an opposite end of the bottom lever 7. A cam drum 9 is rotatably supported by the base plate 4 and has a cam groove engaged with the cam roller 8. A drum gear 10 is rotatable together with the cam drum 9, and a motor gear 11 is meshed with the drum gear 10. A load motor 12 is provided for rotationally driving the motor gear 11. A cartridge hold member 13 has one end rotatably supported by the cartridge holder 2 and is biased toward the cartridge holder 2 by a cartridge spring 14. An upper lever 15 has one end rotatably supported by the cam drum 9, and a cam drum pin 16 is provided on the cam drum 9 for pushing out the magnetic tape cartridge 1 by means of the upper lever 15 when the magnetic tape cartridge is to be ejected.

Now, an operation of the cartridge loading mechanism according to the first embodiment will be described with reference to FIGS. 1 through 3.

The cartridge holder 2 which holds the magnetic tape cartridge 1 in which the magnetic tape is stored supports the guide rollers 3 rotatably with outer ends of the guide rollers 3 being protruded outwardly in a direction perpendicular to an insertion direction of the magnetic tape cartridge 1.

Further, the cartridge holder 2 is vertically movable with vertical movement of the guide rollers 3 along the guide grooves 5 formed in the base plate 4.

The bottom lever 7 rotatably supported on the base plate 4 by lever pivots 6 is arranged in a central portion of the cartridge holder 2 along the insertion direction of the magnetic tape cartridge 1.

The bottom lever 7 has first ends in which the U-shaped grooves 7a are formed, respectively. The guide rollers 3 engage with the grooves 7a, respectively.

On the other hand, the cam roller 8 is rotatably mounted on the opposite end of the bottom lever 7, with the cam roller 8 protruding inwardly in a direction perpendicular to the insertion direction of the magnetic tape cartridge 1.

The cam roller 8 provided on the opposite end of the bottom lever 7 engages with a cam groove 9a formed in a surface of the cam drum 9 which is rotatably supported by the base plate 4.

The cam roller 8 moves along the cam groove 9a provided in the cam drum 9, with which the bottom lever 7 pivots about the lever pivots 6.

The drum gear 10 which rotates together with the cam drum 9 is fixedly secured to an upper portion of a shaft provided on the base plate 4 to rotatably support the cam drum 9.

The motor gear 11 which is arranged in a meshing relation to the drum gear 10 is fixed to an upper portion of a shaft of the load motor 12 which generates a driving force for driving the cartridge holder 2.

When the load motor 12 rotates, the driving force thereof is transmitted to the motor gear 11 and then to the drum gear 10 meshed therewith. The driving force is further transmitted therefrom to the cam drum 9 to rotate the latter.

In this case, the cam roller 8 provided on the opposite end of the bottom lever 7 and engaged with the cam groove 9a formed on the surface of the cam drum 9 moves along the cam groove 9a.

With the movement of the cam roller 8 along the cam groove 9a, the grooves 7a formed in the first ends of the bottom lever 7 are swung vertically about rotation centers of the lever pivots 6 provided in the central portion of the bottom lever 7.

The guide rollers 3 engaged with the grooves 7a of the first ends of the bottom lever 7 are moved vertically with the vertical swing of the first ends of the bottom lever 7 to vertically move the cartridge holder 2 rotatably supporting the guide rollers 3 and the magnetic tape cartridge 1 held by the cartridge holder 2.

The cartridge hold member 13 rotatably mounted on the upper end portion of the cartridge holder 2 is biased toward the magnetic tape cartridge 1 mounted on a bottom portion of the cartridge holder 2 by the cartridge spring 14 provided between a lower portion of the cartridge holder 2 and a central portion of the cartridge hold member 13.

In this state, when the cartridge holder 2 is moved down by the driving force generated by the load motor 12, the magnetic tape cartridge 1 is supported by support pins (not shown) fixedly secured to the base plate 4.

At this time, the cartridge hold member 13 pushes the magnetic tape cartridge 1 to the base plate 4 by the cartridge spring 14.

When the cartridge holder 2 is moved upwardly by the driving force of the load motor 12 and further the cam drum 9 is rotated by the load motor 12, the cam roller 8 provided on the cartridge holder 2 and engaged with the cam groove 9a is moved to a cartridge eject position Pc shown in FIG. 3.

At this time, the upper lever 15 having one end rotatably mounted on the shaft of the cam drum 9 is pushed and rotated by the cam drum pin 16 protruding from the upper surface of the cam drum 9, so that the cartridge holder 2 is moved in a reverse direction to the insertion direction of the magnetic tape cartridge 1 by the eject pin 17 rotatably mounted on the other end of the upper lever 15.

With this movement of the cartridge holder 2, the magnetic tape cartridge 1 held by the cartridge holder 2 is easily ejected.

When the load motor 12 is reversed thereafter, the cam roller 8 provided on the cartridge holder 2 and engaged with the cam groover 9a is moved to a cartridge loading position Pb shown in FIG. 3 and the cartridge holder 2 becomes ready for loading of the next magnetic tape cartridge 1.

When the load motor 12 is further rotated in the reverse direction, the roller 8 is moved to a position at which the eject pin 17 does not obstruct an insertion of the next magnetic tape cartridge 1, that is, a cartridge load position Pa shown in FIG. 3, and moves the cam drum pin 16 protruding from the upper surface portion of the cam drum 9.

A second embodiment of the present invention will be described next with reference to FIG. 4 which is a side view of a cartridge loading mechanism according to the second embodiment and FIG. 5 which is a plan view thereof.

Figure 4:
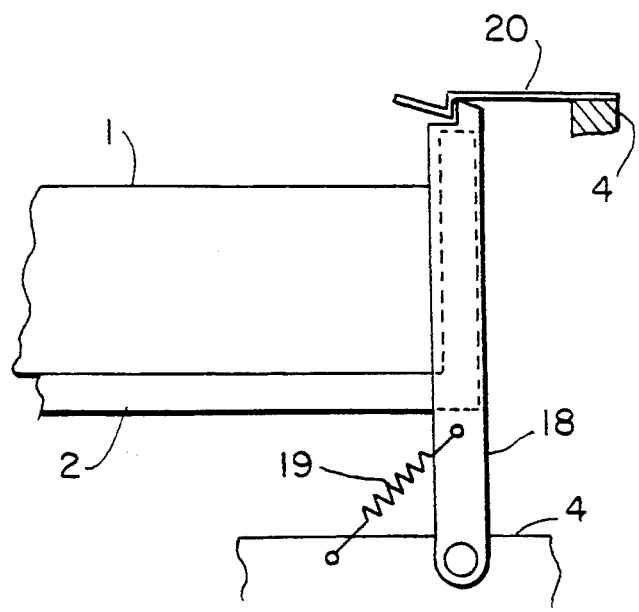
FIG. 4 is a side view of a cartridge loading mechanism of a magnetic tape cartridge apparatus according to a second embodiment of the present invention.

Referring to FIG. 4, the cartridge loading mechanism of a magnetic tape cartridge apparatus according to the second embodiment comprises, in addition to those corresponding to the components constituting the first embodiment, an eject lever 18 having one end rotatably supported on the base plate 4, an eject spring 19 mounted on the eject lever 18 and biasing the eject lever 18 in an ejecting direction of the magnetic tape cartridge 1 and a plate spring 20 having one end fixed to the base plate 4 and the other end for locking the eject lever 18.

An operation of the cartridge load mechanism according to the second embodiment will be described with reference to FIGS. 4 and 5.

Figure 5:
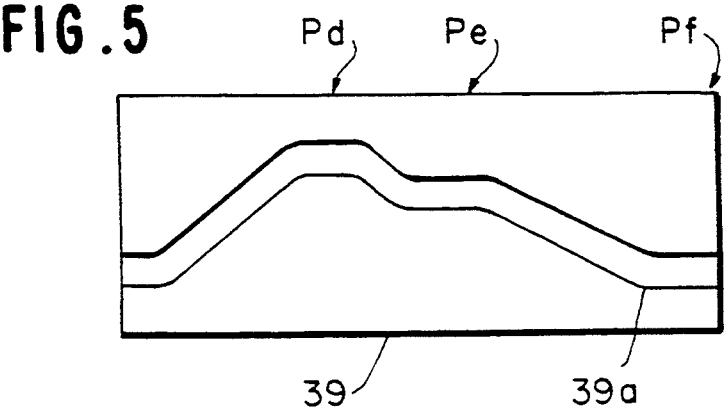
FIG. 5 is an extended view of a cam drum 9 of the second embodiment shown in FIG. 4.

A groove 39a corresponding to the groove 9a in the first embodiment is formed in a surface of a cam drum 39 corresponding to the cam drum 9 in the first embodiment as shown in FIG. 5. The groove 39a includes three steps for providing a stepped vertical movement of the cartridge holder 2.

Rotation of the load motor 12 is transmitted to the cam drum 39 through the motor gear 11 and the drum gear 10.

In this case, the cam roller 8 provided on the other end of the bottom lever 7 and meshed with the cam groove 39a of the cam drum 39 is moved along the cam groove 39a.

With this movement of the cam roller 8, the grooves 7a provided in the first ends of the bottom lever 7 pivot vertically about the lever pivots 6 provided in the central portion of the bottom lever 7.

The guide rollers 3 engaged with the grooves 7a of the bottom lever 7 are moved vertically with the vertical movement of the first ends of the bottom lever 7 to thereby move the cartridge holder 2 rotatably supporting the guide rollers 3 vertically together with the magnetic tape cartridge 1 supported by the cartridge holder 2.

When the cartridge holder 2 is moved upwardly and the cam drum 39 is rotated by the load motor 12, the cam roller 8 provided on the cartridge holder 2 engaged with the cam grooves 39a is moved to a cartridge eject position Pd shown in FIG. 5.

At this stage, the cartridge holder 2 is moved to the uppermost position with movement of the cam roller 8 and pushes up the plate spring 20 provided on the base plate 4 to release the locking of the eject lever 18.

The eject lever 18 thus released is rotated by the eject spring 19 which biases it in the eject direction of the magnetic tape cartridge 1 to thereby move the magnetic tape cartridge 1 held on the cartridge holder 2 to the ejecting direction.

Then, by reversing the rotation of the load motor 12, the roller 8 is moved to a cartridge loading position Pe shown in FIG. 5 and the cartridge holder 2 is moved down to an intermediate position in which a next magnetic tape cartridge 1 can be loaded.

As described hereinbefore, according to the cartridge loading mechanism of the present invention in which the bottom lever for driving the cartridge holder and the load motor are arranged below the cartridge holder and the driving force of the load motor is transmitted to the cartridge holder through the cam, it is possible to restrict the space laterally of the cartridge holder to the irreducible minimum of demand and thus to realize a compact magnetic cartridge apparatus.

Further, since it is possible to arbitrarily set the configuration of the cam for transmitting the driving force of the load motor to the bottom lever and the cartridge holder, it becomes possible to use a small load motor having a small driving force by changing the configuration of the cam according to a state of load and thus to realize a compact magnetic tape cartridge apparatus.

In addition, since the cam grooves provided on the cam drum correspondingly to start and end points of the movement of the bottom lever are substantially perpendicular to the moving direction of the bottom lever, it is possible to prevent a malfunction (reverse rotation) of the load motor and thus improve reliability of the whole magnetic tape cartridge apparatus.

While the present invention has been described in conjunction with the preferred embodiments thereof, it will now be readily possible for those skilled in the art to put this invention into practice in various other manners.

What is claimed is:

1. A cartridge holding mechanism for a magnetic tape cartridge apparatus, comprising:
    a cartridge holder having guide rollers rotatably supported thereby for holding a magnetic tape cartridge housing a magnetic tape;
    a base plate having guide grooves for guiding said guide rollers to move said cartridge holder vertically;
    a bottom lever supported rotatably by said base plate and having first ends formed with grooves which are engaged with said guide rollers, and an opposite end rotatably supporting a cam roller;
    a cam drum rotatably supported by said base plate and having, on a surface thereof, a cam groove engaged with said cam roller and, on an upper portion thereof, a drum gear; and
    a load motor having a motor gear meshed with said drum gear for driving said cartridge holder by rotating said cam drum through said motor gear and said drum gear.

2. The cartridge holding mechanism claimed in claim 1, further comprising:
    a cartridge hold member having one end rotatably supported by said cartridge holder and biased to hold said magnetic tape cartridge;
    an upper lever having one end rotatably supported by said cam drum and an other end rotatably supported by said cartridge holder; and a cam drum pin provided on an upper surface portion of said cam drum and, operative to move said cartridge holder in an ejecting direction of said magnetic tape cartridge held by said cartridge holder through said upper lever.

3. The cartridge holding mechanism claimed in claim 1 or 2, wherein said cam groove has two steps defining a cartridge eject position at which said magnetic tape cartridge is ejected, a cartridge load position at which said magnetic tape cartridge is loaded and an information read position at which an information is read from said magnetic tape cartridge.

4. The cartridge holding mechanism claimed in claim 1, wherein said bottom lever further includes lever pivots for rotatably supporting said bottom lever on said base plate.

5. A cartridge holding mechanism for a magnetic tape cartridge apparatus, comprising:
- a cartridge holder having guide rollers rotatably supported thereby for holding a magnetic tape cartridge housing a magnetic tape;
- a base plate having guide grooves for guiding said guide rollers to move said cartridge holder vertically;
- a bottom lever supported rotatably by said base plate and having first ends formed with grooves which are engaged with said guide rollers, and an opposite end rotatably supporting a cam roller;
- a cam drum rotatably supported by said base plate and having, on a surface thereof, a cam groove engaged with said cam roller and, on an upper portion thereof, a drum gear;
- a load motor having a motor gear meshed with said drum gear for driving said cartridge holder by rotating said cam drum through said motor gear and said drum gear;
- an eject lever having one end rotatably supported by said base plate and having an eject spring for biasing said magnetic tape cartridge in an eject direction thereof; and
- a plate spring provided on said base plate for holding an other end of said eject lever when said magnetic tape cartridge is loaded.

6. The cartridge holding mechanism claimed in claim 5, wherein said cam groove has three steps defining a cartridge eject position at which said magnetic tape cartridge is ejected, a cartridge load position at which said magnetic tape cartridge is loaded and an information read position at which an information is read from said magnetic tape cartridge.

* * * * *